US012615389B2

(12) United States Patent
Hu

(10) Patent No.: US 12,615,389 B2
(45) Date of Patent: Apr. 28, 2026

(54) MEDIA FILE PACKING AND UNPACKING METHOD, APPARATUS AND DEVICE, AND STORAGE MEDIUM

(71) Applicant: Tencent Technology (Shenzhen) Company Limited, Shenzhen (CN)

(72) Inventor: Ying Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 208 days.

(21) Appl. No.: 18/355,769

(22) Filed: Jul. 20, 2023

(65) Prior Publication Data

US 2023/0370638 A1    Nov. 16, 2023

Related U.S. Application Data

(63) Continuation of application No. PCT/CN2022/109517, filed on Aug. 1, 2022.

(30) Foreign Application Priority Data

Aug. 23, 2021    (CN) .......................... 202110968501.9

(51) Int. Cl.
| | |
|---|---|
| *H04N 19/597* | (2014.01) |
| *G06T 3/16* | (2024.01) |
| *G06T 9/00* | (2006.01) |

(52) U.S. Cl.
CPC ............. *H04N 19/597* (2014.11); *G06T 3/16* (2024.01); *G06T 9/00* (2013.01)

(58) Field of Classification Search
None
See application file for complete search history.

(56) References Cited

U.S. PATENT DOCUMENTS

2016/0232939 A1*  8/2016  Malamal Vadakital et al. ...........
                                                        G11B 27/002
2019/0020880 A1    1/2019  Wang
                (Continued)

FOREIGN PATENT DOCUMENTS

| CN | 107534801 A | 1/2018 |
|---|---|---|
| CN | 108833937 A | 11/2018 |
(Continued)

OTHER PUBLICATIONS

Extended European Search Report, Jul. 3, 2024, pp. 1-12, issued in European Patent Application No. 22860185.2, European Patent Office, Munich, Germany.
Chinese Office Action with English translation, May 10, 2024, pp. 1-24, issued in Chinese Application No. 202110968501.9, State Intellectual Property Office, Beijing, China.
(Continued)

*Primary Examiner* — Christopher Braniff
(74) *Attorney, Agent, or Firm* — Crowell & Moring LLP

(57) ABSTRACT

The present subject matter provides a media file packing and unpacking method, apparatus and device, and a storage medium. Code streams after N items are coded. The items comprise point clouds or static panoramic images. N is a positive integer greater than 1. The code streams of the N items are packed into at least one entity group. A first indication information is added to the entity group with regard to each entity group in at least one entity group to obtain media files of the N items. The first indication information indicates the types of all items having an association relation in the entity group. The media files of the N items are transmitted to the file unpacking device.

20 Claims, 6 Drawing Sheets

(56)     References Cited

U.S. PATENT DOCUMENTS

| | | |
|---|---|---|
| 2019/0379884 A1 | 12/2019 | Oh et al. |
| 2021/0195162 A1* | 6/2021 | Chupeau et al. .... H04N 13/161 |

FOREIGN PATENT DOCUMENTS

| | | |
|---|---|---|
| CN | 110941739 A | 3/2020 |
| CN | 112237005 A | 1/2021 |
| CN | 113170236 A | 7/2021 |
| GB | 2567625 A | 4/2019 |
| GB | 2582025 A | 9/2020 |
| WO | WO 2020/260014 A1 | 12/2020 |
| WO | WO 2021/061725 A1 | 4/2021 |
| WO | WO 2021/140274 A1 | 7/2021 |

OTHER PUBLICATIONS

Hannuksela, Miska M., et al., An Overview of Omnidirectional MediA Format (OMAF), Oct. 29, 2020, pp. 1-17, Proceedings of the IEEE.

MPEG 127 version of MPEG Standardisation Roadmap, Jul. 12, 2019, pp. 1-18, WG11, Göteborg, SE.

Sejin, Oh, et al., [40.1] On Encapsulation of G-PCC data in ISOBMFF, Oct. 2020, pp. 1-9, LG Electronics Inc., Online.

Takahashi, Ryohei, et al., [PCC-Systems] On G-PCC bitstream encapsulation in ISOBMFF, Oct. 2019, pp. 1-5, Sony Corporation, Geneva, CH.

International Search Report and Written Opinion received for Application No. PCT/CN2022/109517 mailed Oct. 17, 2022 (English and Chinese languages), (8 pages).

* cited by examiner

MEDIA FILE PACKING AND UNPACKING METHOD, APPARATUS AND DEVICE, AND STORAGE MEDIUM

RELATED APPLICATIONS

The present application is a continuation of PCT application PCT/CN2022/109517, filed on Aug. 1, 2022, which claims priority to application number 202110968501.9, filed on Aug. 23, 2021 and entitled "MEDIA FILE PACKING AND UNPACKING METHOD, APPARATUS AND DEVICE, AND STORAGE MEDIUM." Each application is incorporated herein by reference in its entirety.

FIELD OF THE TECHNOLOGY

Examples of the present subject matter relate to the art of video processing, and in particular, to a media file packing and unpacking method, apparatus and device, and a non-transitory storage medium.

BACKGROUND

Immersive media refer to media contents capable of providing immersive experience for consumers, and the immersive media can be divided into 3 Degree of Freedom (DoF) media, 3DoF+ media, and 6DoF media according to the degree of freedom of a user when consuming the media contents.

However, in the current packing mode of a video code stream, with regard to a media file including a plurality of static panoramic image items, or with regard to a media file including a plurality of point cloud items and a plurality of static panoramic image items, a file unpacking device cannot decode media files corresponding to a part of items, so that the decoding efficiency is low.

BRIEF SUMMARY

The present subject matter provides a media file packing and unpacking method, apparatus and device, and a non-transitory storage medium, and the file unpacking device may decode media files corresponding to a part of items, so that the decoding efficiency is improved.

In a first aspect, the present subject matter provides a media file packing method, which is applied to a file packing device, where the file packing device may be understood as a video packaging device, and the method includes:

acquiring code streams after N items are coded, the items at least including any one of point clouds and static panoramic images, and N is a positive integer greater than 1;

packing the code streams of the N items in at least one entity group, and adding, with regard to each entity group in the at least one entity group, first indication information to the entity group to obtain media files of the N items, the first indication information is used for indicating the types of all items having an association relation in the entity group; and transmitting the media files of the N items to a file unpacking device.

In a second aspect, the present subject matter provides a media file unpacking method, applied to the file unpacking device, the method including:

receiving the media files of the N items transmitted by the file packing device, the items at least including at least one of point clouds and static panoramic images, N is a positive integer greater than 1, the media files including at least one entity group, a code stream of at least one item is packed into the entity group, the media files further including first indication information corresponding to each entity group, and the first indication information is used for indicating the types of all items having the association relation in the entity group;

determining, with regard to each entity group in the at least one entity group, a target item to be decoded in the entity group according to the first indication information corresponding to the entity group;

unpacking the target item to obtain the code stream of the target item; and decoding the code stream of the target item to obtain the target item.

In a third aspect, the present subject matter provides a media file packing apparatus, applied to the file packing device, the apparatus including:

an acquiring unit, configured to acquire code streams after N items are coded, the items at least including any one of point clouds and static panoramic images, and N is a positive integer greater than 1;

a packing unit, configured to pack the code streams of the N items into at least one entity group, and add, with regard to each entity group in the at least one entity group, first indication information to the entity group to obtain the media files of the N items, the first indication information is used for indicating the types of all items having the association relation in the entity group; and a transmitting unit, configured to transmit the media files of the N items to the file unpacking device.

In a fourth aspect, the present subject matter provides a media file unpacking apparatus, applied to the file unpacking device, the apparatus including:

a receiving unit, configured to receive the media files of the N items transmitted by the file packing device, the items at least including at least one of point clouds and static panoramic images, N is a positive integer greater than 1, the media files including at least one entity group, a code stream of at least one item is packed in the entity group, the media files further including first indication information corresponding to each entity group, and the first indication information is used for indicating the types of all items having the association relation in each entity group;

a determining unit, configured to determine, with regard to each entity group in the at least one entity group, a target item to be decoded in the entity group according to the first indication information corresponding to the entity group;

an unpacking unit, configured to unpack the target item to obtain the code stream of the target item; and a decoding unit, configured to decode the code stream of the target item to obtain the target item.

In a fifth aspect, the present subject matter provides a file packing device, including: a processor and a memory, the memory is configured to store a computer program, and the processor is configured to invoke the computer program stored in the memory to execute the method in the first aspect.

In a sixth aspect, the present subject matter provides a file unpacking device, including: a processor and a memory, the memory is configured to store a computer program, and the processor is configured to invoke the computer program stored in the memory to execute the method in the second aspect.

In a seventh aspect, a computing device is provided, including: a processor and a memory, the memory is configured to store a computer program, and the processor is configured to invoke and run the computer program stored in the memory to execute the method in the first aspect and/or the second aspect.

In an eighth aspect, a non-transitory computer readable storage medium is provided, and is configured to store a computer program, and the computer program causes a computer to execute the method in the first aspect and/or the second aspect.

To sum up, in the present subject matter, the file packing device acquires code streams after N items are coded, where the items at least include any one of point clouds and static panoramic images; the file packing device packs the code streams of the N items into at least one entity group to obtain the media files of the N items; with regard to each entity group in the at least one entity group, the first indication information is added to the entity group, and the first indication information indicates the types of all items having the association relation in the entity group; and the file packing device transmits the media files of the N items to the file unpacking device. The file unpacking device determines, with regard to each entity group in the at least one entity group, a target item to be decoded in the entity group according to the first indication information corresponding to the entity group; the target item is unpacked to obtain the code stream of the target item; and the code stream of the target item is decoded to obtain the target item. According to the present subject matter, the first indication information is added to the entity group, the first indication information indicates the types of all items having the association relation in the entity group, so that the file unpacking device can selectively decode the media files corresponding to part of the items for presentation according to the association relation of the items in the entity group indicated by the first indication information, without decoding the media files of all the items, and the decoding efficiency is improved.

BRIEF DESCRIPTION OF THE DRAWINGS

To describe the technical solutions of the examples of the present subject matter more clearly, the following briefly introduces the accompanying drawings required for describing the examples. Apparently, the accompanying drawings in the following description show only some examples of the present subject matter, and a person of ordinary skill in the art may still derive other drawings from these accompanying drawings without creative efforts.

DETAILED DESCRIPTION

Figure 1:
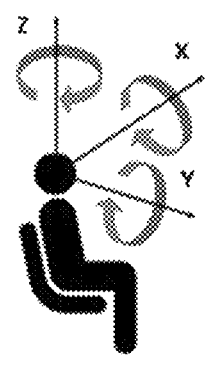
FIG. 1 schematically shows a schematic diagram of three degrees of freedom.

The technical solutions in this example of the present subject matter are clearly and completely described in the following with reference to the accompanying drawings in this example of the present subject matter. Apparently, the described examples are merely some rather than all of the examples of the present subject matter. All other examples obtained by a person of ordinary skill in the art based on the examples of the present subject matter without creative efforts shall fall within the protection scope of the present subject matter.

In the specification, claims, and the foregoing accompanying drawings of the present subject matter, the terms "first", "second", and so on are intended to distinguish between similar objects rather than indicating a specific order or precedence order. It is to be understood that such used data is interchangeable where appropriate so that the examples of the present subject matter described here can be implemented in an order other than those illustrated or described here. Moreover, the terms "include", "contain" and any other variants mean to cover the non-exclusive inclusion, for example, a process, method, system, product, or server that includes a list of steps or units is not necessarily limited to those expressly listed steps or units, but may include other steps or units not expressly listed or inherent to such a process, method, system, product, or device.

Examples of the present subject matter relate to a data processing technology for immersive media.

Before the technical solutions of the present subject matter are introduced, the related knowledge of the present subject matter is introduced as follows:

panoramic videos/images: after multi-camera acquisition, splicing and mapping are implemented, part of media pictures may be provided according to the viewing orientation or a window of a user, and videos or images of pictures of 360 degrees at most are provided. The panoramic videos/images are immersive media that provides an experience of three degrees of freedom.

Multi-view-angle/multi-viewpoint video: a multi-view-angle/multi-view-point video refers to a video with depth information, which is shot by a plurality of groups of camera arrays from a plurality of angles. The multi-view-angle/multi-viewpoint video is also called a free-view-angle/free-viewpoint video, and is an immersive media that provides an experience of six degrees of freedom.

Point cloud: a point cloud is a discrete point set that is randomly distributed in space and represents the spatial structure and surface property of a three-dimensional object or scene. Each point in the point cloud at least has three-dimensional position information, and may have color, material or other information according to different application scenes. Generally, each point in the point cloud has the same number of additional properties.

V3C volumetric media: visual volumetric video-based coding media refers to immersive media coded with traditional videos, including multi-view-angle video, video coded point clouds, and the like in file packing containing volumetric video type tracks, captured from three-dimensional spatial visual contents and providing a 3DoF+, 6DoF viewing experience.

PCC: PCC refers to point cloud compression.

G-PCC: G-PCC refers to geometry-based point cloud compression.

V-PCC: V-PCC refers to video-based point cloud compression.

Drawing set: a drawing set indicates region information on a 2D planar frame, region information of a 3D presentation space, and a mapping relation between the region information on the 2D planar frame and the region information of the 3D presentation space and necessary parameter information required for mapping.

Track: a track is a media data set in a media file packing process, and a media file may include a plurality of tracks, for example, a media file may include a video track, an audio track, and a subtitle track.

Sample: a sample is a packing unit in the media file packing process, and one media track includes a plurality of samples. For example, a sample of a video track is generally a video frame.

DoF: DoF refers to degree of freedom. DoF refers to the number of independent coordinates in a mechanical system, and includes the degree of freedom of rotation and vibration in addition to the degree of freedom of translation. In this example of the present subject matter, when the user watches the immersive media, DoF refers to supported movement, and the degree of freedom of content interaction is generated.

3DoF: 3DoF is three degrees of freedom, and refers to three degrees of freedom of the user's head rotating around XYZ axes. FIG. 1 schematically shows a schematic diagram of three degrees of freedom. As shown in FIG. 1, the head can be turned, lowered up and down, or swung, which means that the head can be rotated on three axes at a certain place and a certain point. With the experience of three degrees of freedom, the user can be immersed in 360 degrees in a scene. If it is static, it can be understood as a panoramic picture. If the panoramic picture is dynamic, it is a panoramic video, namely a VR video. However, the VR video has certain limitations, and the user cannot move and choose any place to see.

Figure 2:
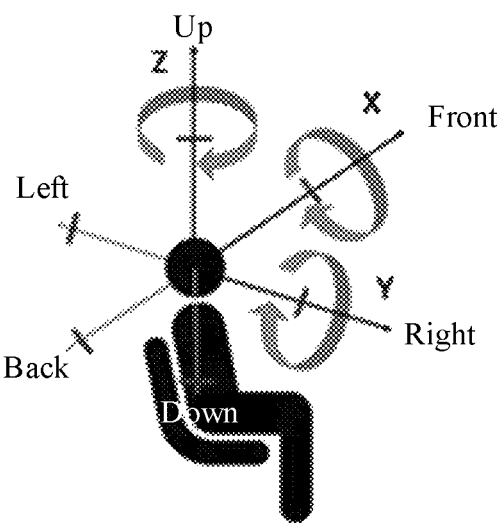
FIG. 2 schematically shows a schematic diagram of three degrees of freedom+.

3DoF+: on the basis of three degrees of freedom, the user also has the degree of freedom for performing limited movement along the XYZ axes, which can also be called limited six degrees of freedom, and the corresponding media code stream can be called as a limited six-degrees-of-freedom media code stream. FIG. 2 schematically shows a schematic diagram of three degrees of freedom+.

Figure 3:
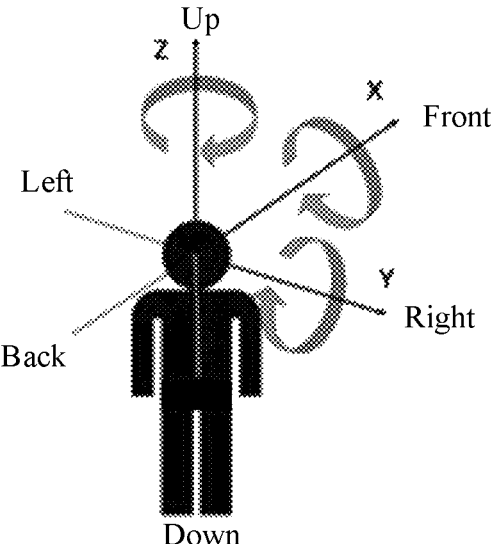
FIG. 3 schematically shows a schematic diagram of sixth degrees of freedom.

6DoF: on the basis of three degrees of freedom, the user also has the degree of freedom of free movement along XYZ axes, and the corresponding media code stream can be called a six-degree-of-freedom media code stream. FIG. 3 schematically shows a schematic diagram of six degrees of freedom. 6DoF media refers to a 6-degree-of-freedom video, and refers to a video that can provide a high-degree-of-freedom viewing experience in which the user freely moves a viewpoint in directions of the XYZ axes of a three-dimensional space and freely rotates the viewpoint around the XYX axes. 6DoF media is a combination of different spatial view angles of videos acquired by a camera array. To facilitate the expression, storage, compression and processing of 6DoF media, 6DoF media data is expressed as a combination of the following information: texture maps acquired by multiple cameras, depth maps corresponding to the texture maps of the multiple cameras, and corresponding 6DoF media content description metadata. The metadata includes parameters of the multiple cameras and description information such as splicing layout and edge protection of the 6DoF media. At a coding end, the information of the texture maps of the multiple cameras and the information of the corresponding depth maps are spliced, and the description data of the splicing mode is written into the metadata according to the defined grammar and semantic description. The spliced information of the depth maps and texture maps of the multiple cameras is coded in a flat video compression mode, and is transmitted to a terminal for decoding, and then 6DoF virtual viewpoints requested by the user are synthesized, so that the viewing experience of the 6DoF media of the user is provided.

AVS: AVS refers to audio video coding standard.

ISOBMFF: ISOBMFF refers to ISO based media file format, and is a standard media file format based on international standard organization (ISO). ISOBMFF is a packing standard of media files, and a MP4 (moving picture experts group 4) file is the most typical ISOBMFF file.

DASH: dynamic adaptive streaming over HTTP is an adaptive bit rate streaming technology, so that high-quality streaming media can be transmitted by a traditional HTTP network server through the Internet.

MPD: media presentation description refers to media presentation description signaling in DASH, and describes media fragment information.

HEVC: High efficiency video coding refers to international video coding standard HEVC/H.265.

VVC: versatile video coding refers to international video coding standard VCC/H.266.

Intra (picture) prediction.

Inter (picture) prediction.

SCC: SCC refers to screen content coding.

Panoramic videos or images are generally shot, spliced, and mapped from a plurality of cameras onto a scene, resulting in a spherical video or image with a 360-degree image range. The panoramic videos or images are typical 3DoF media.

Generally, a multi-view-angle video is shot from a scene from multiple angles by a camera array, and texture information (color information and the like) and depth information (spatial distance information and the like) of the scene are formed, and then mapping information from the 2D planar frame to the 3D presentation space is added, so that 6DoF media capable of is consumed on a user side is formed.

a point cloud is a discrete point set that is randomly distributed in space and represents the spatial structure and surface property of a three-dimensional object or scene. Each point in the point cloud at least has three-dimensional position information, and may have color, material or other information according to different application scenes. Generally, each point in the point cloud has the same number of additional properties.

The point cloud can flexibly and conveniently express the spatial structure and surface property of a three-dimensional object or scene, so the application is wide, including virtual reality (VR) games, computer aided design (CAD), geography information system (GIS), autonomous navigation system (ANS), digital cultural heritage, free viewpoint broadcasting, three-dimensional immersive remote presentation, three-dimensional reconstruction of biological tissue organs, and the like.

The point cloud is obtained mainly by the following ways: computer generation, 3D laser scanning, 3D photogrammetry, and the like. A computer may generate a point cloud of virtual three-dimensional objects and scenes. By 3D scanning, a point cloud of a static real world three-dimensional object or scene may be obtained, and millions of point clouds may be obtained per second. By 3D camera shooting, point clouds of dynamic real world three-dimensional objects or scenes may be obtained, and ten million of point clouds may be obtained per second. In addition, in the medical field, from MRI, CT and electromagnetic localization information, point clouds of biological tissues and organs may be obtained. By the technologies, the point cloud data acquisition cost and the time period are reduced, and the accuracy of the data is improved. Revolution of the point cloud data acquisition mode causes acquisition of a large amount of point cloud data to be possible. Along with continuous accumulation of large-scale point cloud data, efficient storage, transmission, release, sharing and standardization of the point cloud data become the key of point cloud application.

After the point cloud media is coded, the coded data stream needs to be packed and transmitted to the user. Correspondingly, at a point cloud media player end, a point cloud file needs to be unpacked first and then decoded, and finally the decoded data stream is presented. Therefore, in the unpacking link, after specific information is acquired, the efficiency of the decoding link can be improved to a certain extent, so that better experience is brought to presentation of the point cloud media.

Figure 4A:
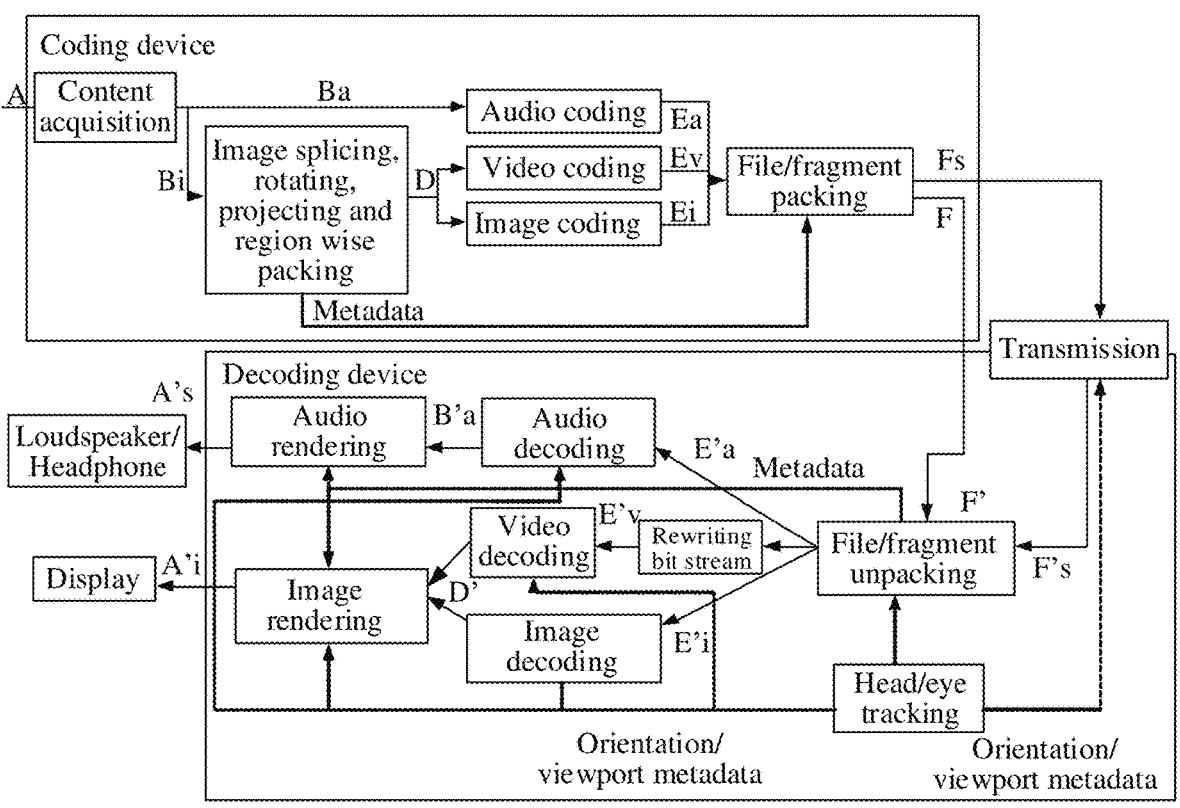
FIG. 4A is a schematic diagram of a coding-decoding process of an immersive media system according to an example of the present subject matter.

FIG. 4A is a schematic diagram of a coding-decoding process of an immersive media system according to an example of the present subject matter. As shown in FIG. 4A, the immersive media system includes a coding device and a decoding device, the coding device may refer to a computer device used by a provider of the immersive media, and the computer device may be a terminal (for example, a PC (personal computer), a smart mobile device (for example, a smart phone), and the like.) or a server. The decoding device may refer to a computer device used by the user of the immersive media, and the computer device may be a terminal (for example, a PC (personal computer), a smart mobile device (for example, a smart phone), and a VR device (for example, a VR helmet, VR glasses, and the like)). The data processing course of the immersive media includes a data processing course on a coding device side and a data processing course on a decoding device side.

The data processing course at the coding device end mainly includes:

(1) an acquiring and making process of media contents of the immersive media; and (2) a coding and file packing process of the immersive media. The data processing course at the decoding device end mainly includes:

(3) a file unpacking and decoding process of the immersive media; and (4) a rendering process of the immersive media.

In addition, a transmission process of the immersive media involves between the coding device and the decoding device, the transmission process can be implemented on the basis of various transmission protocols, and the transmission protocols herein can include but are not limited to: a DASH (dynamic adaptive streaming over HTTP) protocol, a HLS (HTTP live streaming) protocol, a SMTP (smart media transport protocol), a TCP (transmission control protocol), and the like.

The various processes involved in the data processing course of the immersive media will be respectively described in detail below with reference to FIG. 4A.

Firstly, a data processing course at the coding device end:

(1) an acquiring and making process of media contents of the immersive media.

1) an acquiring process of the media contents of the immersive media.

An audiovisual scene (A) of the real world is captured by an audio sensor and a group of cameras or a camera device with multiple lenses and sensors. A group of digital image/video (Bi) and audio (Ba) signals are acquired and generated. A camera/lens generally covers all directions around the center point of a camera group or a camera device and is therefore referred to as a 360-degree video.

In one implementation, a capturing device may refer to a hardware component arranged in the coding device, for example, the capturing device refers to a microphone, a camera, a sensor, and the like of the terminal. In another implementation, the capturing device may also be a hardware apparatus connected to the coding device, for example, a camera connected to a server.

The capturing device may include but is not limited to: an audio device, a camera device and a sensing device. The audio device may include an audio sensor, a microphone and the like. The camera device may include a common camera, a stereo camera, an optical field camera and the like. The sensing device may include a laser device, a radar device and the like.

The number of capturing devices may be multiple, the capturing devices are deployed at specific locations in real space to simultaneously capture audio contents and video contents from different angles within the space, the captured audio contents and video contents remain synchronized in both time and space. The media contents acquired by the capturing devices are referred to as raw data for the immersive media.

2) A making process of the media contents of the immersive media.

The captured audio contents are contents suitable for being subjected to audio coding of the immersive media. After a series of making processes, the captured video contents may become contents suitable for being subjected to video coding of the immersive media, and the making processes include:

i) splicing. The captured video contents are obtained by shooting by means of the capturing device at different angles, and the splicing means that the video contents shot at all the angles are spliced into a complete video capable of reflecting 360-degree visual panorama in a real space, namely the spliced video is a panoramic video (or spherical video) represented in a three-dimensional space.

ii) projecting. The projecting refers to a process of mapping a three-dimensional video formed by splicing to a two-dimensional (3-Dimension, 2D) image, and the 2D image formed by projecting is called a projected image; The manners of projecting may include but are not limited to: longitude and latitude map projecting and regular hexahedron projecting.

iii) region wise packing. The projected image may be coded directly, and the projected image may also be coded after being subjected to region wise packing. In practice, it is found that in the data processing course of the immersive media, the video coding efficiency of the immersive media can be greatly improved by performing region wise packing on the two-dimensional projected image and then coding the two-dimensional projected image, and therefore the region wise packing technology is widely applied to the video processing course of the immersive media. The region wise packing refers to a process of performing conversion processing on the projected image by region, and in the region wise packing process, the projected image is converted into a packed image. The process of region wise packing specifically includes: the projected image is divided into a plurality of mapping regions, then the plurality of mapping regions are respectively subjected to conversion processing to obtain a plurality of packing regions, and the plurality of packing regions are mapped into one 2D image to obtain a packed image. The mapping region refers to a region obtained by dividing in the projected image before performing region wise packing; and the packing region is a region located in the packed image after region wise packing is executed.

The conversion processing may include but is not limited to: processing of mirroring, rotating, rearranging, upsampling, downsampling, changing of the resolution of regions, moving and the like.

Since only panoramic video can be captured by using the capturing device, such video can be processed by the coding device and transmitted to the decoding device for corresponding data processing, the user on the decoding device side can only view 360-degree video information by performing some specific actions (such as head rotation), while corresponding video changes cannot be obtained by performing unspecific actions (such as head movement), and the VR experience is not good, so that depth information matched with the panoramic video needs to be additionally provided to enable the user to obtain better immersion degree and better VR experience, which relates to a 6DoF (Six Degrees of Freedom) making technology. When the user can move more freely in a simulated scene, it is called 6DoF. When the 6DoF making technology is utilized to make the video contents of the immersive media, an optical field camera, a laser device, a radar device and the like may be generally selected as the capturing device to capture point cloud data or optical field data in a space, and some specific processing, such as processes of cutting and mapping the point cloud data, a depth information calculation process and the like, is required in the process of executing the making processes i)-iii).

The images (Bi) of the same time instance are spliced, rotated, projected and mapped onto the packed image (D).

(2) A coding and file packing process of the immersive media.

The captured audio contents can be directly subjected to audio coding to form an audio code stream of the immersive media. After the above-mentioned making processes i)-ii) or i)-iii), video coding is performed on the projected image or the packed image to obtain a video code stream of the immersive media, for example, the packed image (D) is coded into a coded image (Ei) or a coded video bit stream (Ev). The captured audio (Ba) is coded into an audio bit stream. Then, the coded images, video and/or audio are then combined into a media file (F) for file playback or a sequence of initialization and media fragments (Fs) for stream transmission according to a specific media container file format. The coding device end also includes metadata, such as projection and region information, into the file or fragment to facilitate presentation of the decoded packed image.

If the 6DoF making technology is utilized, a specific coding mode (such as point cloud coding) is required to be utilized for coding in a video coding process. Audio code streams and video code streams are packed in a file container according to a file format (such as an ISOBMFF (ISO Base Media File Format)) of the immersive media to form a media file resource of the immersive media. The media file resource can be a media file or a media fragment to form a media file of the immersive media. Metadata of the media file resource of the immersive media is recorded by using media presentation description information (MPD) as required by a file format of the immersive media. The metadata herein is a generic term for information related to the presentation of the immersive media, and the metadata can include description information for media contents, description information for windows, and signaling information related to the presentation of the media contents, and so on. As shown in FIG. 4A, the coding device stores media presentation description information and media file resources formed after the data processing course.

An immersive media system supports a box, the box refers to data blocks or objects of the metadata, that is, the box contains metadata of the corresponding media contents. The immersive media may include a plurality of boxes, including, for example, a sphere region zooming box containing metadata used for describing sphere region zooming information; a 2D region zooming box containing metadata used for describing 2D region zooming information; and a region wise packing box containing metadata used for describing corresponding information in a region wise packing process, and the like.

The fragments (Fs) are delivered to a player by using a delivery mechanism.

Secondly, a data processing course at the decoding device end:

(3) a file unpacking and decoding process of the immersive media; and the decoding device can obtain the media file resources of the immersive media and the corresponding media presentation description information from the coding device by means of recommendation of the coding device or adaptive dynamic according to requirements of the user at the decoding device end, for example, the decoding device can determine the orientation and position of the user according to the tracking information of the head/eyes/body of the user, and then dynamically request the coding device to obtain the corresponding media file resources on the basis of the determined orientation and position. The media file resources and the media presentation description information are transmitted from the coding device to the decoding device via a transmission mechanism (for example, DASH and SMT). The file unpacking process of the decoding device end is opposite to the file packing process of the coding device end, and the decoding device unpacks the media file resources according to the file format requirement of the immersive media to obtain the audio code streams and the video code streams. The decoding process of the decoding device end is opposite to the coding process of the coding device end, and the decoding device performs audio decoding on the audio code streams to restore the audio contents.

In addition, the decoding process of the video code streams by the decoding device includes:

i) decoding the video code streams to obtain a planar image; according to the metadata provided by the media presentation description information, if the metadata indicates that the immersive media has performed a region wise packing process, the planar image refers to the packed image; and if the metadata indicates that the immersive media has not performed the region wise packing process, the planar image refers to a projected image; and ii) if the metadata indicates that the immersive media has performed the region wise packing process, the decoding device performs region wise unpacking on the packed image to obtain the projected image. Here, the region wise unpacking is opposite to the region wise packing, and the region wise unpacking refers to a process of performing reverse conversion processing on the packed image by region, and the region wise unpacking causes the packed image to be converted into the projected image. The process of the region wise unpacking specifically includes: performing reverse conversion processing on the plurality of packing regions in the packed image according to the indication of the metadata to obtain a plurality of mapping regions, and mapping the plurality of mapping regions to one 2D image to obtain the projected image. Reverse conversion processing refers to processing reverse to conversion processing, for example: the conversion processing refers to a counterclockwise rotation of 90 degrees, and the reverse conversion processing refers to a clockwise rotation of 90 degrees.

iii) Reconstruction processing is performed on the projected image according to the media presentation description information to convert the projected image into a 3D image. The reconstruction processing herein refers to processing of re-projecting the two-dimensional projected image into a 3D space.

(4) A rendering process of the immersive media.

the decoding device renders the audio contents obtained by decoding audio and the 3D image obtained by decoding video according to metadata related to rendering and windows in the media presentation description information, and the 3D image is played and outputted after the rendering is completed. In particular, if the making technologies of 3DoF and 3DoF+ are utilized, the decoding device renders the 3D image mainly on the basis of a current viewpoint, parallax, depth information, and the like, and if the making technology of 6DoF is utilized, the decoding device renders the 3D image within a window mainly on the basis of the current viewpoint. The viewpoint refers to a viewing position of the user, the parallax refers to a visual line difference generated by binocular eyes of the user or a visual line difference generated due to movement, and the window refers to a viewing region.

An immersive media system supports a box, the box refers to data blocks or objects of the metadata, that is, the box contains metadata of the corresponding media contents. The immersive media may include a plurality of boxes, including, for example, a sphere region zooming box containing metadata used for describing sphere region zooming information; a 2D region zooming box containing metadata used for describing 2D region zooming information; and a region wise packing box containing metadata used for describing corresponding information in a region wise packing process, and the like.

For example, as shown in FIG. 4A, a file (F) outputted from the coding device end is the same as a file (F') inputted from the decoding device end. The decoding device end processes the file (F') or received fragment (F's) to extract the coded bit stream (E'a, E'v and/or E'i), and analyzes the metadata. Viewport-related video data may be carried in multiple tracks, and the tracks may be overwritten in the bit stream before decoding and are merged into a single video bit stream E'v. The audio, video and/or images are then decoded into decoded signals (B'a is an audio signal and D' is an image/video signal). The decoded image/video (D') is displayed on a screen of a head-mounted display or any other display device on the basis of the current viewing direction or viewport, as well as information such as projection, spherical overlay, rotation and region in the metadata. The current viewing direction is determined by head tracking information and/or eye tracking information. Meanwhile, the decoded audio signal (B'a) is rendered, for example, the decoded audio signal is listened by the user via headphones. In addition to the video signal and the audio signal is rendered, the current viewing direction may also be used for optimizing decoding. In the dependent delivery of the viewport, the current viewing direction is also passed to a policy module that determines the video track to receive according to the viewing direction.

Figure 4B:
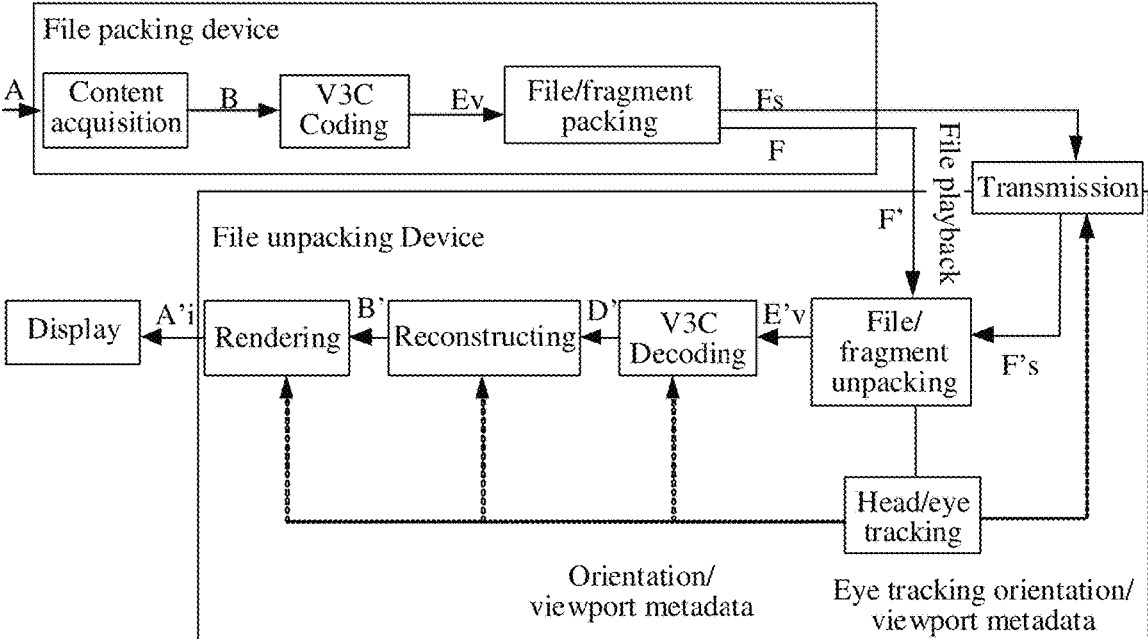
FIG. 4B is a schematic diagram of a coding-decoding process of V3C media according to an example of the present subject matter.

FIG. 4B is a schematic diagram of a coding-decoding process of the V3C *media* according to an example of the present subject matter, as shown in FIG. 4B, the immersive media system includes a file packing device and a file unpacking device. In some examples, the file packing device may be understood as the coding device described above, and the file unpacking device may be understood as the decoding device described above.

A real world or synthetic visual scene (A) is captured by a group of cameras, or a camera device with multiple lenses and sensors, or a virtual camera. The acquisition result is source volumetric data (B). One or more volume frames are coded as a V3C bit stream, including one atlas bit stream, at most one occupancy bit stream, one geometric bit stream, and zero or more property bit streams (Ev).

Then, according to a specific media container file format, the one or more coded bit streams are packed into a media file (F) for local playback or a sequence of initialization and media fragments (Fs) for stream transmission. The media container file format is the ISO base media file format specified in ISO/IEC 14496-12. The file packing device may also include metadata into the files or fragments. The fragments (Fs) are delivered to the decoding device by using the delivery mechanism.

The file (F) outputted from the file packing device is the same as the file (F') inputted from the file unpacking device. The file unpacking device processes the file (F') or received fragment (F's) to extract the coded bit stream (E'v), and analyzes the metadata. Then the V3C bit stream is decoded into a decoded signal (D'). The decoded signal (D') is reconstructed, rendered and displayed on a screen of a head-mounted display or any other display device on the basis of the current viewing direction or viewport. The current viewing direction is determined by head tracking information and/or eye tracking information. In the dependent delivery of the viewport, the current viewing direction is also passed to a policy module that determines the track to receive according to the viewing direction.

The above process is applicable to real-time and on-demand use cases.

The following describes related boxes involved into this example of the present subject matter:

object association box

Box Type: 'oapc'

Container: GroupsListBox

Mandatory: No

Quantity: Zero or More

When the Box Type of the EntityToGroupBox is 'oapc', it indicates that an association relation on content exists between all tracks and items in the entity group, and one or more tracks or items in the entity group can be presented according to requirements when presenting.

| Grammar |
| --- |
| aligned(8) class ObjectAssociationBox<br>extends EntityToGroupBox('oapc') {<br>unsigned int(32) group_id;<br>unsigned int(32) num_entities_in_group;<br>for(i=0; i<num_entities_in_group; i++){<br>    unsigned int(32) entity_id;<br>    unsigned int(1) entry_media_flag;<br>    bit(7) reserved;<br>    string media_description;<br>    }<br>} | group_id: it is a non-negative integer used for identifying a specific entity group. The value of the field cannot be the same as the group_id of any other entity group; nor can it be the same as any other item_ID or track_ID containing a GroupsListBox.

num_entities_in_group: it specifies the number of entry_id values that map to the entity group.

entity_id: it is a value of the item_ID of a certain item or a value of the track_ID of a certain track.

entry_media_flag: it indicates whether the item is a track or item in the entity group that is consumed first by the user.

media_description: it indicates the description information of the corresponding track or item as a character string ending with a null character.

In the related art, only different objects of point cloud media are associated, and in practical applications, an association relation often exists between static panoramic images, for example, an association relation between a plurality of panoramic images shot by different cameras. Therefore, in the related art, with regard to a media file including a plurality of static panoramic image items or a media file including a plurality of point cloud items and a plurality of static panoramic image items, the file unpacking device cannot determine the association relation between the items, and thus cannot decode the media files of a part of the items, so that the decoding efficiency is low.

In order to solve the technical problem, in the present subject matter, code streams of the N items including point clouds and/or static panoramic images are packed in at least one entity group, and with regard to each entity group, first indication information is added to the entity group, and the first indication information indicates the types of all items having an association relation in the entity group, so that the file unpacking device can selectively decode media files corresponding to part of the items to be presented according to the association relation of the items in the entity group indicated by the first indication information, without decoding the media files of all the items, and thus, the decoding efficiency is improved.

The technical solutions of this example of the present subject matter are described in detail by means of some examples below. The several following examples may be mutually combined, and same or similar concepts or processes may not be repeatedly described in some examples.

Figure 5:
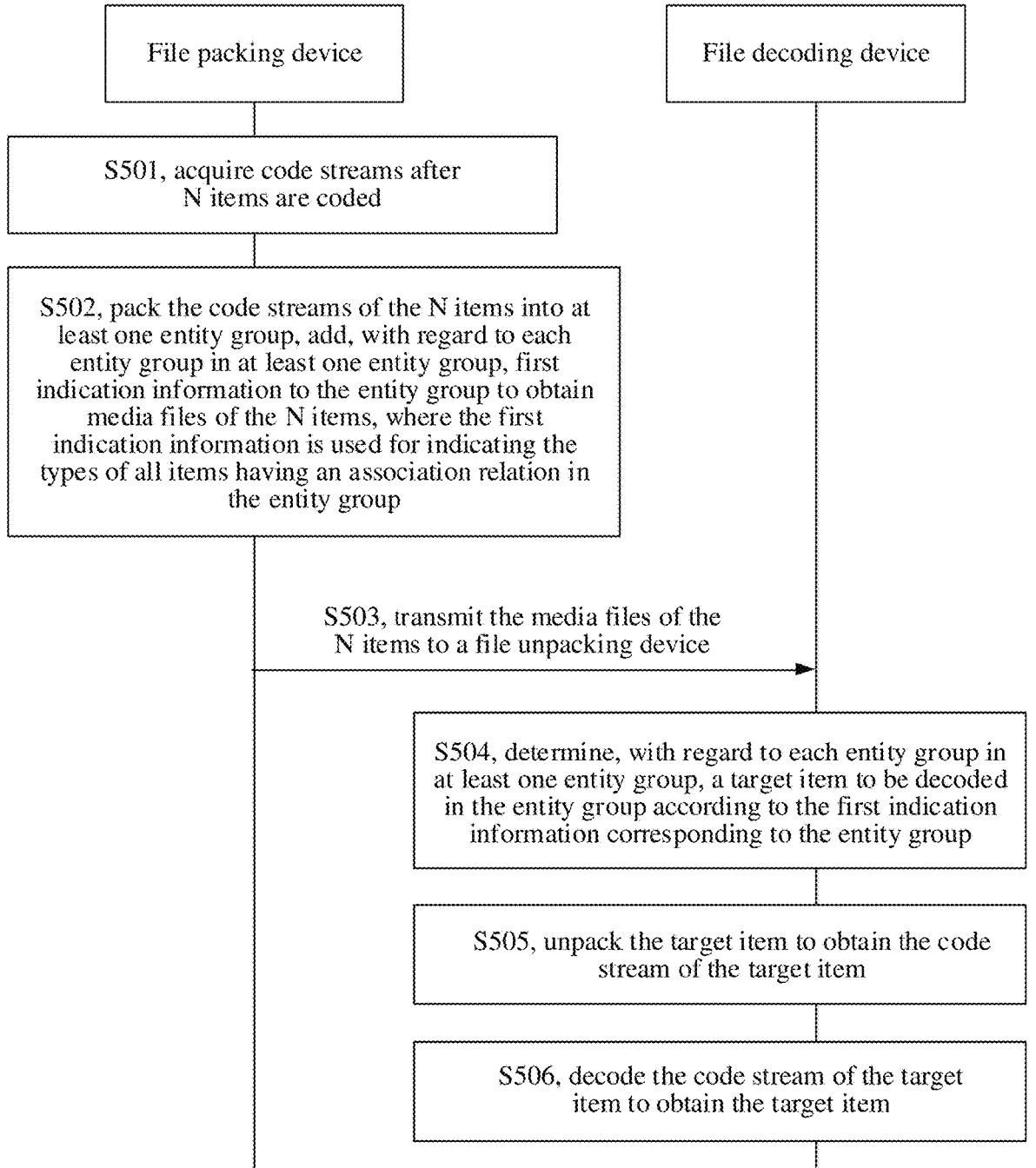
FIG. 5 is an interaction flowchart of a media file packing and unpacking method according to this example of the present subject matter.

FIG. 5 is an interaction flowchart of a media file packing and unpacking method according to this example of the present subject matter; as shown in FIG. 5, the method includes the following steps:

S501, the file packing device acquires code streams after N items are coded.

The items at least include any one of point clouds and static panoramic images, and N is a positive integer greater than 1.

In this example of the present subject matter, one point cloud is referred to as one item, or one static panoramic image is referred to as one item.

The N items of this example of the present subject matter can be all point clouds, can also be all static panoramic images, and can also include part of point clouds and part of static panoramic images.

For example, N is 3, and the 3 items may all be point clouds of 3 different objects, or all of the 3 items are static panoramic images acquired from different view angles, or 2 items in the 3 items are point clouds of different objects, and one item is a static panoramic image acquired from one view angle.

In some examples, the file packing device is also referred to as a video packing device, or a video coding device.

In this example of the present subject matter, the modes for acquiring the code streams after the N item are coded by the file packing device include but are not limited to:

first mode, the file packing device acquires the code streams after the N items are coded from other devices.

For example, the file packing device acquires the code streams after the N items are coded from a storage device, or acquires the code streams after the N items are coded from other coding devices.

Second mode, the file packing device codes the N items to obtain the code streams after the N items are coded. For example, the file packing device is a coding device, and after acquiring the N items from an acquiring device (for example, a camera), the file packing device codes the N items to obtain the code streams of the N items.

S502, the file packing device packs the code streams of the N items into at least one entity group, and adds, with regard to each entity group in the at least one entity group, the first indication information into the entity group to obtain the media files of the N items, where the first indication information indicates the types of the items having the association relation in the entity group.

The file packing device divides the code streams of the N items into at least one entity group according to the association relation among the N items, and one entity group includes the code stream of at least one item.

For example, assuming that N=100, each 10 items are grouped into one entity group, and then 10 entity groups are obtained. Each entity group includes code streams of 10 items.

The existence of the association relation among the items described in this example of the present subject matter may be understood as the existence of the association relation on the contents of the items.

In one example, the existence of the association relation over the contents of the items may be that the contents of the items are partially or fully the same, for example, each item is a panoramic image acquired of the same static scene from different viewpoints.

In another example, the existence of the association relation on the contents of the items may also be existence of an association relation among objects corresponding to the items, for example, an object 1 is a computer, an object 2 is a table, and the computer is placed on the table, which may be referred to as that the object 1 and the object 2 have an association relation. This example of the present subject matter does not limit the type of the specific association relation existing among the items, and only two items are associated in content, namely the two items have an association relation.

In order to facilitate the file unpacking device to process the media files, the first indication information is added to each entity group, and the first indication information indicates the types of the items having the association relation in the entity group. Therefore, after the file unpacking device receives the media files, the file unpacking device may process the media files of part of the items according to the first indication information carried in the entity group.

In a possible implementation manner, with regard to each entity group, the first indication information corresponding to the entity group is added in the entity group.

In a possible implementation manner, with regard to each entity group, the first indication information corresponding to the entity group is added to the media file outside entity group, for example, as a separate box for indication.

In some examples, the items having an association relation in an entity group include: at least one of static panoramic images and point clouds, static panoramic images from different viewpoints, and point clouds of different static objects.

Example one, 3 items are included in one entity group, and the 3 items are respectively static panoramic images from 3 different viewpoints.

Example two, 3 items are included in one entity group, and the 3 items are respectively point clouds of 3 different static objects.

Example three, 3 items are included in one entity group, 2 items in the 3 items are point clouds of different static objects, and one item is a static panoramic image acquired from one view angle. Or, 1 item of the 3 items is a point cloud of a static object, and 2 items are static panoramic images from different viewpoints.

This example of the present subject matter does not limit the specific form of the first indication information.

In a possible implementation manner, the first indication information is a first field in a first box, and the first box indicates that all items in the entity group have an association relation with each other.

In the implementation manner, with regard to each entity group, when determining that the contents of the items in the entity group have an association relation with each other, the file packing device adds the first box in the media files. The first box indicates that all the items in the entity group have an association relation with each other. Meanwhile, in order to further explain the types of the items having the association relation in the entity group, in this example of the present subject matter, the first field is added to the first box to indicate the types of the items having the association relation in the entity group, for example, different values of the first field indicate the types of the items having the association relation in the entity group.

In some examples, if the value of the first field is a first numerical value, the first field indicates that the items having the association relation in the entity group are static panoramic images from different viewpoints; or, if the value of the first field is a second numerical value, the first field indicates that the items having the association relation in the entity group are point clouds of different static objects compressed in a point cloud compression mode on the basis of a geometric model; or, if the value of the first field is a third numerical value, the first field indicates the items having the association relation in the entity group are the point clouds of different static objects compressed in a point cloud compression mode on the basis of traditional video coding; or, if the value of the first field is a fourth numerical value, the first field indicates that the items having the association relation in the entity group are the point clouds of the static panoramic images and the static objects.

The correspondence between the value of the first field and the types of the items having the association relation in the entity group indicated by the first field is shown in table 1:

TABLE 1

| Value of the first field | Types of all the items |
|---|---|
| First numerical value | The items having the association relation in the entity group are static panoramic images from different viewpoints. |
| Second numerical value | The items having the association relation in the entity group are point clouds of different static objects compressed in a point cloud compression mode VPCC on the basis of a geometric model. |
| Third numerical value | The items having the association relation in the entity group are point clouds of different static objects compressed in a point cloud compression mode GPCC on the basis of the traditional video coding. |
| Fourth numerical value | The items having the association relation in the entity group are the point clouds of the static panoramic images and the static objects. |

This example of the present subject matter does not limit the first numerical value, the second numerical value, the third numerical value and the fourth numerical value specifically, and the specific values are determined according to actual needs.

Optionally, the first numerical value is 0.

Optionally, the second numerical value is 1.

Optionally, the third numerical value is 2.

Optionally, the fourth numerical value is 3.

In some examples, the first box may be an immersive item association box (imia for short).

If the packing standard of the media files is ISOBMFF, the first field is represented by field association_type.

The immersive item association box of this example of the present subject matter includes the following contents:

box type: 'imia' included in: GroupsListBox

Whether to force or not: No

Quantity: 0 or more

When the box type of EntityToGroupBox is 'imia', it indicates that all items in the entity group have an association relation with each other, and one or more items in the entity group can be presented according to requirements when presenting.

| Grammar |
|---|

```
aligned(8) class ImmersiveItemAssociationBox    extends
EntityToGroupBox('imia') {
   unsigned int(32) group_id;
        unsigned int(32) num_entities_in_group;
        unsigned int(32) association_type;
        for(i=0; i<num_entities_in_group; i++){
      unsigned int(32) entity_id;
        unsigned int(1) entry_media_flag;
      bit(7) reserved;
      string media_description;
   }
}
```

Semantic Description group_id: it is a non-negative integer used for identifying a particular group. The value of the field cannot be the same as the group_id of any other entity group; nor can it be the same as any other item_ID or track_ID containing a GroupsListBox.

num_entities_in_group: it indicates the number of entity_id mapped to the entity group.

association_type: it indicates the type of immersive item association. Meaning of the field is shown in the following table 2:

TABLE 2

| Value of association_type | Meanings |
| --- | --- |
| 0 | The items having the association relation in the entity group are static panoramic images from different viewpoints. |
| 1 | The items having the association relation in the entity group are point clouds of different static objects compressed on the basis of VPCC. |
| 2 | The items having the association relation in the entity group are point clouds of different static objects compressed on the basis of GPCC. |
| 3 | The items having the association relation in the entity group are the point clouds of the static panoramic images and the static objects. | entity_id: it is a value of the item_ID of a certain item or a value of the track_ID of a certain track.

entry_media_flag indicates whether the item is a track or item in the entity group that is consumed first by the user.

media_description indicates description information of the corresponding track or item as a character string ending with a null character.

In an implementation manner, the first field is used as the first indication information, and different values are taken for the first field to indicate the types of the items having the association relation in the entity group. Therefore, after the file unpacking device receives the media file, the types of the items having the association relation in the entity group can be determined according to the value of the first field in the first box, and then part or all of the items in the entity group are selectively decoded according to actual needs for display.

In another possible implementation manner, if the items having the association relation in the entity group are static panoramic images from different viewpoints, the first indication information is a second box, and the second box indicates that the items having the association relation in the entity group are static panoramic images from different viewpoints.

In some examples, the second box may be a viewpoint item association box (vpia for short).

The viewpoint item association box of this example of the present subject matter includes the following contents:

box type: 'vpia' included in: GroupsListBox

Whether to force or not: no

Quantity: 0 or more

When the box type of EntityToGroupBox is 'vpia', it indicates that the items having the association relation in the entity group are static panoramic images from different viewpoints.

| Grammar |
| --- |
| aligned(8) class ViewpointItemAssociationBox extends EntityToGroupBox('vpia') {<br>   unsigned int(32) group_id;<br>      unsigned int(32) num_entities_in_group;<br>   unsigned int(32) initial_viewpoint_ID;<br>   (note: optionally, it may directly indicate an initial viewpoint ID or may mark the<br>initial viewpoint by an identification bit.)<br>      for(i=0; i<num_entities_in_group; i++){<br>      unsigned int(32) entity_id;<br>      unsigned int(1) initial_viewpoint_flag;<br>     bit(7) reserved;<br>     string viewpoint_label;<br>   }<br>} |

Semantic description group_id: it is a non-negative integer used for identifying a specific entity group. The value of the field cannot be the same as the group_id of any other entity group; nor can it be the same as any other item_ID or track_ID containing a GroupsListBox.

num_entities_in_group: it indicates the number of entity_id mapped to the entity group.

initial_viewpoint_ID: it indicates entity_id of the initial viewpoint.

entity_id: it is a value of the item_ID of a certain item or a value of the track_ID of a certain track.

initial_viewpoint_flag: it indicates whether the item is an initial viewpoint.

viewpoint_label: it indicates a descriptive label for the corresponding viewpoint as a character string ending with a null character.

In the implementation manner, if the items having the association relation in the entity group are static panoramic images from different viewpoints, the items having the association relation in the entity group is indicated as static panoramic images from different viewpoints in a manner of the second box. Therefore, after the file unpacking device receives the media files, the second box can determine that the items having the association relation in the entity group are static panoramic images from different viewpoints, and then selectively decode the static panoramic images of part or all of the viewpoints according to actual needs for display.

In another possible implementation manner, if the items having the association relation in the entity group are point clouds of different static objects compressed in a point cloud compression manner on the basis of a geometric model, the first indication information is a third box, and the third box indicates that the items having the association relation in the entity group are point clouds of different static objects compressed in a point cloud compression manner on the basis of a geometric model.

In some examples, the third box may be a V3C object association box (v3oa for short).

The V3C item association box of this example of the present subject matter includes the following contents:

box type: 'v3oa' included in: GroupsListBox

Whether to force or not: No

Quantity: 0 or more

When the box type of EntityToGroupBox is 'v3oa', it indicates that the items in the entity group are different V3C point cloud objects associated with each other in content.

```
                        Grammar
      aligned(8) class V3CObjectAssociationBox extends
      EntityToGroupBox('vpia') {
      unsigned int(32) group_id;
          unsigned int(32) num_entities_in_group;
      unsigned int(32) initial_object_ID;
      (note: optionally, it may directly indicate the initial
      object ID or may mark the
    initial object by an identification bit.)
          for(i=0; i<num_entities_in_group; i++){
          unsigned int(32) entity_id;
              unsigned int(1) entry_media_flag;
          bit(7) reserved;
          string object_label;
              }
      }
```

Semantic Description

> group_id: it is a non-negative integer used for identifying a specific entity group. The value of the field cannot be the same as the group_id of any other entity group; nor can it be the same as any other item_ID or track_ID containing a GroupsListBox.
>
> num_entities_in_group: it indicates the number of entity_id mapped to the entity group.
>
> initial_object_ID: it indicates entity_id of the initially presented object.
>
> entity_id: it is a value of the item_ID of a certain item or a value of the track_ID of a certain track.
>
> entry_media_flag: it indicates whether the item is the object that is consumed first by the user in the entity group.
>
> object_label: it is the descriptive label of the object, and is a character string ending with a null character.

In the implementation manner, if the items having the association relation in the entity group are point clouds of different static objects compressed in a point cloud compression manner on the basis of a geometric model, the items having the association relation in the entity group are indicated as the point clouds of different static objects in a manner of the third box, and the compression manner of each point cloud is VPCC. Therefore, after the file unpacking device receives the media files, the third box can determine that the items having the association relation in the entity group are point clouds of different static objects, the compression mode of each point cloud is VPCC, and then the point clouds of part or all of the static objects are selectively decoded according to actual needs for display.

The above example illustrates an indication manner of the first indication information, but the indication manner of the first indication information in this example of the present subject matter includes, but is not limited to, the above several manners, which is not limited in this example of the present subject matter, and only the types of the items having the association relation in the entity group may be indicated.

S503, the file packing device transmits the media files of the N items to the file unpacking device.

After adding the first indication information to each entity group in the media files, the file packing device transmits the media files to the file unpacking device.

S504, the file unpacking device determines, with regard to each entity group in the at least one entity group, a target item to be decoded in the entity group according to the first indication information corresponding to the entity group.

After receiving the media files of the N items, the file unpacking device determines the target item to be decoded in each entity group according to the first indication information corresponding to each entity group in the media files.

The target item is determined from each entity group in the same manner, for convenience of description, one entity group is taken as an example here.

In an example, if the first indication information indicates that the items having the association relation in the entity group are static panoramic images from different viewpoints, the static panoramic image of the viewpoint matched with the current view angle of the user is determined as the target item to be decoded in the entity group according to the current view angle of the user. Or, all the static panoramic images having the association relation in the entity group are taken as target items to be decoded.

In an example, if the first indication information indicates that the items having the association relation in the entity group are point clouds of different static objects, the point cloud of the static object from the viewpoint matched with the current view angle of the user is determined as the target item to be decoded in the entity group according to the current view angle of the user. Or, the point clouds of all the static objects having the association relation in the entity group are taken as target items to be decoded.

In an example, if the first indication information indicates that the items having the association relation in the entity group are point clouds of static objects and static panoramic images, the static panoramic image and/or the point cloud of the static object from the viewpoint matched with the current view angle of the user is determined as the target item to be decoded in the entity group according to the current view angle of the user.

After the target item to be decoded in the entity group is determined according to the above manner, the following steps S505 and S506 are performed.

S505, the file unpacking device unpacks the target item to obtain the code stream of the target item.

S506, the file unpacking device decodes the code stream of the target item to obtain the target item.

In S505, the file unpacking device unpacks the target item to obtain the code stream of the target item, in S506, the file unpacking device decodes the code stream of the target item, and the target item can be obtained by utilizing the related art, and the details are not repeated here.

According to the media file packing method provided by this example of the present subject matter, the file packing device acquires code streams after N items are coded, where the items include any one of point clouds and static panoramic images; the code streams of the N items are packed into at least one entity group to obtain the media files of the N items; with regard to each entity group in the at least one entity group, the first indication information is added to the entity group, and the first indication information indicates the types of all items having the association relation in the entity group; and the media files of the N items are transmitted to the file unpacking device. The file unpacking device determines, with regard to each entity group in the at least one entity group, the target item to be decoded in the entity group according to the first indication information corresponding to the entity group; the target item is unpacked to obtain the code stream of the target item; and the code stream of the target item is decoded to obtain the target item. According to the present subject matter, the first indication information is added to the entity group, the first indication information indicates the types of all items having the association relation in the entity group, so that the file unpacking device can selectively decode the media files corresponding to part of the items for presentation according to the association relation of the items in the entity group indicated by the first indication information, without decoding the media files of all the items, and the decoding efficiency is improved.

Figure 6:
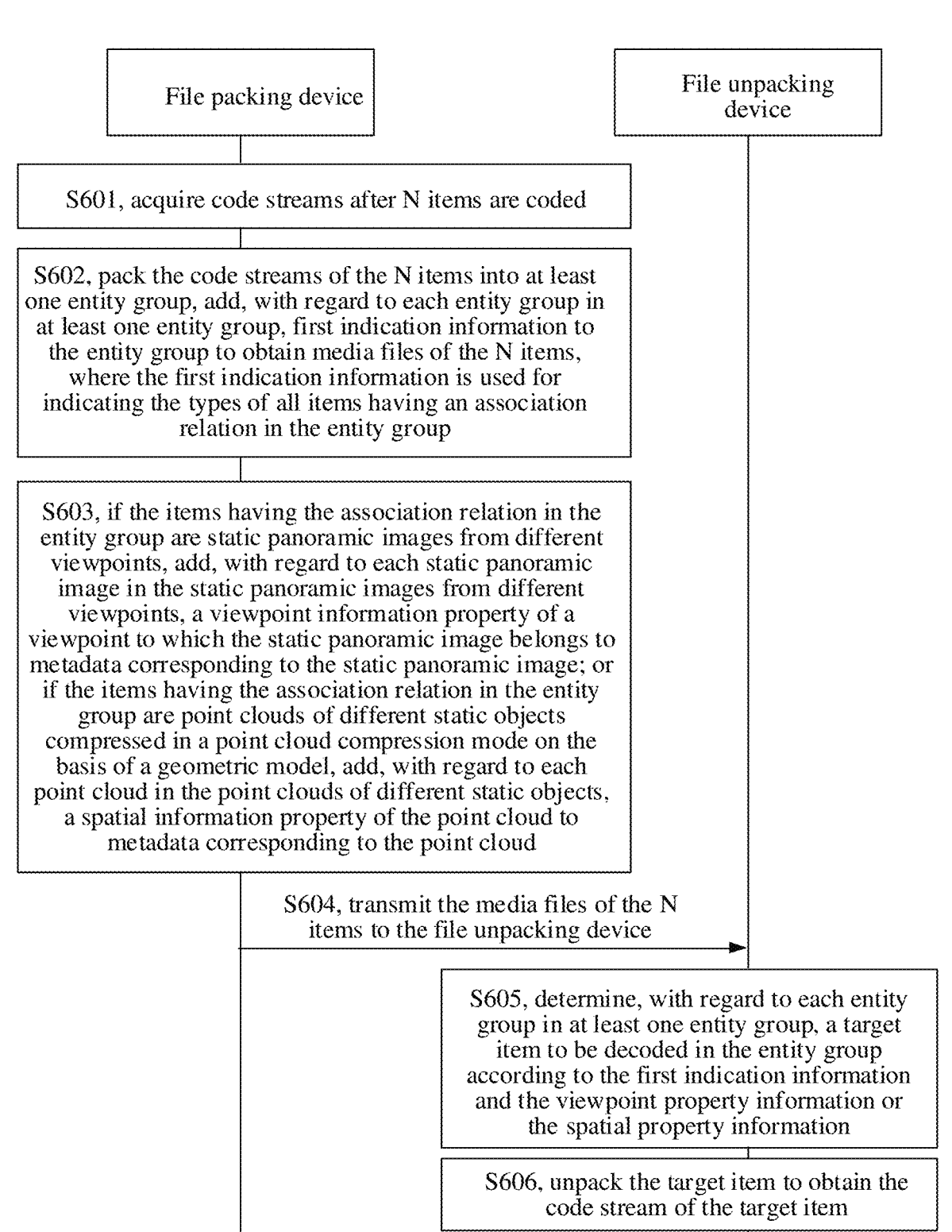
FIG. 6 is an interaction flowchart of a media file packing and unpacking method according to this example of the present subject matter.

In some examples, in order to further facilitate that the file unpacking device may decode data of a required item for display according to actual needs, in addition to adding the first indication information to the entity group, in this example of the present subject matter, viewpoint information corresponding to the item or spatial information corresponding to the item is also added according to the types of the items included in the entity group, which is specifically shown in FIG. 6.

FIG. 6 is a flowchart of a media file packing method according to this example of the present subject matter, as shown in FIG. 6, the method may include the following steps:

S601, the file packing device acquires code streams after N items are coded.

S602, the file packing device packs the code streams of the N items into at least one entity group, and adds, with regard to each entity group in the at least one entity group, the first indication information into the entity group to obtain the media files of the N items, where the first indication information indicates the types of the items having the association relation in the entity group.

The implementation processes of S601 and S602 are the same as those of S501 and S502, and refer to the description of S501 and S502, which are not described herein again.

S603, if the items having the association relation in the entity group are static panoramic images from different viewpoints, the file packing device adds, with regard to each static panoramic image in the static panoramic images from different viewpoints, a viewpoint information property of a viewpoint to which the static panoramic image belongs in the metadata corresponding to the static panoramic image; Or, if the items having the association relation in the entity group are the point clouds of different static objects compressed in a point cloud compression mode on the basis of a geometric model, the file packing device adds, with regard to each point cloud in point clouds of different static objects, the spatial information property of the point cloud in the metadata corresponding to the point cloud.

Case 1, if the items having the association relation in the entity group are static panoramic images from different viewpoints, the file packing device adds, with regard to each static panoramic image in the static panoramic images from different viewpoints, a viewpoint information property of a viewpoint to which the static panoramic image belongs in the metadata corresponding to the static panoramic image.

Optionally, if the items are static panoramic images, the viewpoint information property of the viewpoint corresponding to the static panoramic image may be included in the item property box. The item property box includes metadata associated with the static panoramic images.

Illustratively, the viewpoint information property of the viewpoint to which the static panoramic image belongs include: at least one of the coordinates of the viewpoint and an identification of a viewpoint group to which the viewpoint belongs.

In one possible implementation manner, the grammar of the viewpoint information property of the viewpoint to which the static panoramic image belongs includes the following contents:

box type: 'vpip'
property type: descriptive property
included in: ItemPropertyContainerBox Mandatory (per item): No
Quantity (per item): 0 or 1
the viewpoint information property describes viewpoint information of the panoramic images.

```
aligned(8) class ViewpointInfoProperty extends
ItemFullProperty('vpip', 0, 0) {
        ViewpointInfoStruct( );
}
aligned(8) ViewpointInfoStruct(gcs_rotation_flag) {
ViewpointPosStruct( );
if(gcs_rotation_flag)
    ViewpointGlobalCoordinateSysRotationStruct( );
        unsigned int(1) group_alignment_flag;
bit(7) reserved = 0;
if(group_alignment_flag){
        ViewpointGroupStruct( );
}
aligned(8) ViewpointPosStruct( ) {
signed int(32) pos_x;
signed int(32) pos_y;
signed int(32) pos_z;
unsigned int(1) gpspos_present_flag;
bit(31) reserved = 0;
if(gpspos_present_flag) {
    signed int(32) gpspos_longitude;
    signed int(32) gpspos_latitude;
    signed int(32) gpspos_altitude;
}
}
aligned(8) class ViewpointGlobalCoordinateSysRotationStruct( ) {
unsigned int(8) 3D_rotation_type;
if(3D_rotation_type = 0){
signed int(32) gcs_yaw;
signed int(32) gcs_pitch;
signed int(32) gcs_roll;
}
if(3D_rotation_type = 1){
    float(32) gcs_x;
    float(32) gcs_y;
    float(32) gcs_z;
    float(32) gcs_w;
}
}
aligned(8) class ViewpointGroupStruct( ) {
    unsigned int(8) group_id;
    string group_description;
}
``` pos_x, pos_y and pos_z: they indicate Cartesian coordinate values of a 3D spatial position of a viewpoint in a common reference coordinate system centered at (0, 0, 0). With regard to a dynamic viewpoint, an initial viewpoint position for the dynamic viewpoint is specified.

gpspos_present_flag: it indicates whether a flag bit for a viewpoint GPS position exists. If it equals to 1, it indicates that the viewpoint GPS position exists, and if it equals to 0, it indicates that the viewpoint GPS position does not exist.

gpspos_longitude, gpspos_latitude and gpspos_altitude: they respectively indicate the longitude coordinate, latitude coordinate and altitude coordinate of the viewpoint GPS position.

gcs_rotation_flag: if it equals to 1, it indicates that a rotation angle of X, Y and Z coordinate axes of a global coordinate system of the viewpoint with respect to a common reference coordinate system exists, namely, gcs_yaw, gcs_pitch and gcs_roll exist; and if it equals to 0, it indicates that gcs_yaw, gcs_pitch and gcs_roll do not exist.

3D_rotation_type: it indicates the type of representation of rotation information. If the value of the field is 0, it indicates that the rotation information is given in the form of Euler angle; if the value of the field is 1, it indicates that the rotation information is given in the form of a quaternion. The rest values are reserved.

gcs_yaw, gcs_pitch and gcs_roll: they indicate the yaw, pitch and roll angles, respectively, of the X, Y and Z axes of the global coordinate system of the viewpoint with respect to the rotation direction of the coordinate axes of the common reference coordinate system, given in the form of Euler angles. gcs_x, gcs_y, gcs_z and gcs_w indicate the rotation angle components of the global coordinate system of the viewpoint with respect to the common reference coordinate system, respectively, given in the form of quaternions.

Note: when the viewpoints are switched, the rotation direction of the global coordinate system of the viewpoint determines the viewing direction of the user when the panoramic video track is played in the global coordinate system of the viewpoint.

If group_alignment_flag equals to 1, it indicates that ViewpointGroupStruct( ) exists, and that the viewpoint belongs to an independent coordinate system (and origin of coordinates); and if it equals to 0, it indicates that the viewpoint belongs to the common reference coordinate system.

Note: when two viewpoints have different group_ids, their position coordinates are not comparable because they belong to different coordinate systems. The group_id indicates an identifier of a viewpoint group, all viewpoints in the viewpoint group share a common reference coordinate system.

group_description provides a textual description of the viewpoint group, and is a UTF-8 character string ending with a null value.

According to this example of the present subject matter, if the items having the association relation in the entity group are the static panoramic images from different viewpoints, with regard to each static panoramic image in the static panoramic images from the different viewpoints, the viewpoint information property of the viewpoint to which the static panoramic image belongs is added to the metadata corresponding to the static panoramic image, so that the file unpacking device can select the media files corresponding to part of the viewpoints to decode according to the interactive operation of the user and the viewpoint information property of the viewpoint, and then, the decoding efficiency is improved.

Case 2, if the items having the association relation in the entity group are the point clouds of different static objects compressed in a point cloud compression mode on the basis of a geometric model, with regard to each point cloud of the point clouds of the different static objects, the spatial information property of the point cloud is added to the metadata corresponding to the point cloud.

Optionally, if the items are the point clouds of the static objects and the compression method of the point clouds is VPCC, the spatial information property of the point cloud of the static object may be included in the item property container box. The item property container box includes metadata associated with the point cloud of the static object.

Exemplarily, the spatial information property of the point cloud of the static object includes: coordinates of the point cloud space region.

In one possible implementation manner, the grammar of the spatial information property of the point cloud of the static object includes the following contents:

box type: 'v3sp'
property type: descriptive property included in: Item Property Container Box
Mandatory (per item): no
Quantity (per item): 0 or 1
the volumetric item spatial information property describes 3D spatial information of static volumetric media.

```
aligned(8) class V3CSpatialInfoProperty extends
ItemFullProperty('v3sp', 0, 0) {
    3DSpatialRegionStruct ( );
}
aligned(8) class 3DPoint( ) {
    unsigned int(16) x;
    unsigned int(16) y;
    unsigned int(16) z;
}
aligned(8) class CuboidRegionStruct( ) {
    unsigned int(16) cuboid_dx;
    unsigned int(16) cuboid_dy;
    unsigned int(16) cuboid_dz;
}
aligned(8) class 3DSpatialRegionStruct(dimensions_included_flag) {
    unsigned int(16) 3d_region_id;
    3DPoint anchor;
    if (dimensions_included_flag) {
        CuboidRegionStruct( );
    }
}
```

3d_region_id: it is an identifier of a space region.

x, y, z: they are the x, z, y coordinate values of the 3D point in the Cartesian coordinate system.

cuboid_dx, cuboid_dy, cuboid_dz: they are the sizes of a cuboid sub-region in the Cartesian coordinate system along the x, y and z axes with respect to an anchor.

anchor: it serves as a 3D point of an anchor for a 3D space region in the Cartesian coordinate system.

dimensions_included_flag: it is an identifier indicating whether a space region dimension has been marked.

According to this example of the present subject matter, if the items having the association relation in the entity group are point clouds of different static objects, with regard to the point cloud of each static object in the point clouds of different static objects, the spatial information property of the point cloud is added in the metadata corresponding to the point cloud, so that the file unpacking device can select the media files corresponding to part of the point clouds to decode according to the interaction operation of the user and the spatial information property of the point cloud, and thus, the decoding efficiency is improved.

S604, the file packing device transmits the media files of the N items to the file unpacking device.

S605, the file unpacking device determines, with regard to each entity group in the at least one entity group, the target item to be decoded in the entity group according to the first indication information and the viewpoint property information or the spatial property information.

In an example, if the first indication information indicates that the items having the association relation in the entity group are static panoramic images from different viewpoints, and the metadata of each static panoramic image includes a viewpoint information property of a viewpoint corresponding to each static panoramic image, the file unpacking device determines, according to the interaction operation of the user and the viewpoint information property of the viewpoint corresponding to the static panoramic image, the static panoramic image that conforms to the interaction operation of the user in the entity group as a target item to be decoded in the entity group.

In an example, the interaction operation of the user may be the viewing angle, which is captured by the file packing device, of the user, for example, an offset position of the head of the user. Therefore, the static panoramic image which conforms to the viewing angle of the user can be selected according to the viewing angle of the user and the viewpoint information property of the viewpoint corresponding to the static panoramic image, and the static panoramic image is determined as the target item to be decoded in the entity group.

In an example, the user may perform interaction operation by clicking a view angle selection option on the file packing device to select a certain view angle 1, so that the file packing device selects a static panoramic image that conforms to the view angle 1 according to the view information property of the viewpoint corresponding to the static panoramic image, and the static panoramic image is determined as the target item to be decoded in the entity group.

For example, according to the association relation between panoramic media static items, a plurality of media resources having the association relation on contents are associated by using an Immersive Item Association Box, that is, a first field in the first box is used as the first indication information to indicate the types of the items having the association relation in the entity group.

If the media file F1 contains static panoramic images from 3 different viewpoints, the related fields of the media file F1 are:

ImmersiveItemAssociationBox: association_type=0;
{entity_id=1; entry_media_flag=1; media_description= 'living room'}
{entity_id=2; entry_media_flag=0; media_description='bedroomA'}
{entity_id=3; entry_media_flag=0; media_description= 'bedroomB'}

The file packing device adds corresponding viewpoint info property to the metadata of 3 items, respectively, as follows:

Item1:item_id=1; ViewpointInfoProperty: {pos=0,0,0}
Item2:item_id=2; ViewpointInfoProperty: {pos=100,0,0}
Item3:item_id=3; ViewpointInfoProperty: {pos=100,100, 0}

As shown in table 1, association_type=0 indicates that the items having the association relation in the entity group are static panoramic images from 3 different viewpoints.

entity_id is a value of item_ID of a certain item or a value of track_ID of a certain track, and in this example, entity_id and item_id have the same value.

entry_media_flag indicates whether the item is an object that is consumed first by the user in the entity group, if entry_media_flag=1, it indicates that the item is an object that is consumed first by the user in the entity group, and if entry_media_flag=0, it indicates that the item is not an object that is consumed first by the user in the entity group.

media_description indicates description information of the corresponding track or item, and is a character string ending with a null character, for example, media_description='living room' indicates that Item1 is from living room, media_description='bedroomA' indicates that Item2 is from bedroomA, and media_description='bedroomB' indicates that Item3 is from bedroomB.

pos indicates a viewpoint position corresponding to the item.

The file packing device transmits the media file F1 to the file unpacking device.

The file unpacking device receives F1, and decodes item1 first for presentation according to entry_media_flag information in the ImmersiveItemAssociationBox in F1. Then, according to the interaction operation of the user and ViewpointInfoProperty of item 1 to item 3, item 2 or item 3 is selectively decoded for presentation.

In an example, if the first indication information indicates that the items having the association relation in the entity group are point clouds of different static objects compressed in a point cloud compression mode on the basis of a geometric model, and the metadata of the point cloud of each static object includes the spatial information property of each point cloud, the point cloud of the static object, which conforms to the interaction operation of the user, in the entity group is determined as the target item to be decoded in the entity group according to the interaction operation of the user and the spatial information property of each point cloud.

In an example, the interaction operation of the user may be the viewing angle, which is captured by the file packing device, of the user, for example, an offset position of the head of the user. Therefore, the point cloud conforming to the viewing angle of the user can be selected according to the viewing angle of the user and the spatial information property of the point cloud, and the point cloud is determined as the target item to be decoded in the entity group.

In an example, the user may perform interaction operation by clicking a space region selection option on the file packing device, and selects a certain space region 1, so that the file packing device selects the point cloud conforming to the space region 1 according to the spatial information property of the point cloud, and the point cloud is determined as the target item to be decoded in the entity group.

For example, according to the association relation between panoramic media static items, a plurality of media resources having the association relation on contents are associated by using an Immersive Item Association Box, that is, a first field in the first box is used as the first indication information to indicate the types of the items having the association relation in the entity group.

If the media file F2 contains point clouds for 2 different space regions, the related fields for the media file F2 are:

ImmersiveItemAssociationBox: association_type=1;
{entity_id=1; entry_media_flag=1; media_description= 'front'}
{entity_id=2; entry_media_flag=0; media_description= 'back'}.

The file packing device adds corresponding spatial information property (for example, V3CSpatialInfoProperty) to the metadata of 2 items, specifically as follows:

Item1:item_id=1; V3CSpatialInfoProperty: {3d_region_ id=1; anchor=0,0,0; cuboid=100,100,100}
Item2: item_id=1; V3CSpatialInfoProperty: {3d_region_ id=2; anchor=0,100,0; cuboid=100,100,100}.

As shown in table 1, association_type=1 indicates that the items having the association relation in the entity group are point clouds of 2 different static objects.

entity_id is a value of item_ID of a certain item or a value of track_ID of a certain track, and in this example, entity_id and item_id have the same value.

entry_media_flag indicates whether the item is an object that is consumed first by the user in the entity group, if entry_media_flag=1, it indicates that the item is an object that is consumed first by the user in the entity group, and if entry_media_flag=0, it indicates that the item is not an object that is consumed first by the user in the entity group.

media_description indicates description information of the corresponding track or item as a character string ending with a null character, for example, media_description='front' indicates that the Item1 is from the front, and media_description='back' indicates that the Item2 is from the back.

The file packing device transmits the media file F2 to the file unpacking device.

The file unpacking device receives F1, and decodes item1 first for presentation according to entry_media_flag information in the ImmersiveItemAssociationBox. Then, according to the interaction operation of the user and the spatial information property corresponding to the item1 and the item2, the item2 is selectively decoded for presentation.

In S606, the file unpacking device unpacks the target item to obtain the code stream of the target item.

In S607, the file unpacking device decodes the code stream of the target item to obtain the target item.

According to the media file packing method provided by this example of the present subject matter, if the items having the association relation in the entity group are static panoramic images from different viewpoints, with regard to each static panoramic image in the static panoramic images from different viewpoints, the viewpoint information property of the viewpoint to which the static panoramic image belongs is added to the metadata corresponding to the static panoramic image, so that the file unpacking device can select media files corresponding to part of the viewpoints to decode according to the interaction operation of the user and the viewpoint information property of the viewpoint. Or, if the items having the association relation in the entity group are point clouds of different static objects, with regard to the point cloud of each static object in the point clouds of different static objects, the spatial information property of the point cloud is added to the metadata corresponding to the point cloud, so that the file unpacking device can select the media files corresponding to part of the point clouds to decode according to the interaction operation of the user and the spatial information property of the point clouds, and then, the decoding efficiency is improved.

It is to be understood that FIG. 5 to FIG. 6 are only examples of the present subject matter and are not be construed as limiting the present subject matter.

The preferred examples of the present subject matter have been described in detail above with reference to the accompanying drawings. However, the present subject matter is not limited to the specific details in the foregoing implementation manners, a plurality of simple deformations may be made to the technical solutions of the present subject matter within a range of the technical concept of the present subject matter, and these simple deformations fall within the protection scope of the present subject matter. For example, the various specific technical features described in the foregoing specific implementation manners may be combined in any suitable manner without contradiction, and in order to avoid unnecessary repetition, various possible combinations that may be made are not described separately in the present subject matter. In addition, different implementation manners of the present subject matter may also be arbitrarily combined without departing from the idea of the present subject matter, and these combinations shall still be regarded as contents disclosed in the present subject matter.

Method examples of the present subject matter are described in detail above in conjunction with FIG. 5 and FIG. 6, and apparatus examples of the present subject matter are described in detail below in conjunction with FIG. 7 to FIG. 9.

Figure 7:
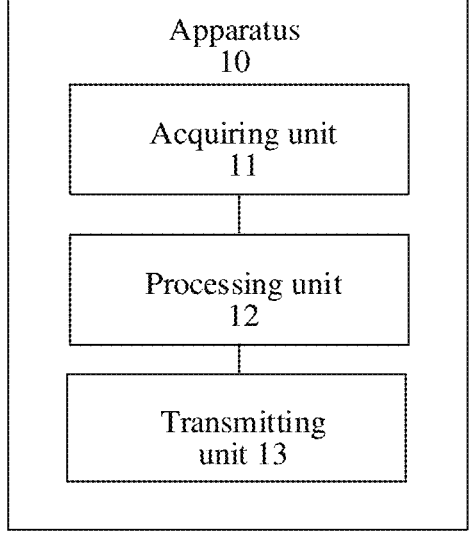
FIG. 7 is a schematic structural diagram of a media file packing apparatus according to an example of the present subject matter.

FIG. 7 is a schematic structural diagram of a media file packing apparatus according to an example of the present subject matter; and the apparatus 10 is applied to the file packing device, and the apparatus 10 includes: an acquiring unit 11, configured to acquire code streams after N items are coded, the items at least including any one of point clouds and static panoramic images, and N is a positive integer greater than 1; a processing unit 12, configured to pack the code streams of the N items into at least one entity group, and add, with regard to each entity group in the at least one entity group, first indication information to the entity group to obtain the media files of the N items, the first indication information is used for indicating the types of all items having the association relation in the entity group; and a transmitting unit 13, configured to transmit the media files of the N items to the file unpacking device.

In some examples, the items having the association relation in the entity group include: at least one of static panoramic images and point clouds, static panoramic images from different viewpoints, and point clouds of different static objects.

In an example, if the items having the association relation in the entity group are static panoramic images from different viewpoints, the processing unit 12 is further configured to add, with regard to each static panoramic image in the static panoramic images from different viewpoints, a viewpoint information property of a viewpoint to which the static panoramic image belongs to the metadata corresponding to the static panoramic image; or, if the items having the association relation in the entity group are point clouds of different static objects compressed in a point cloud compression manner on the basis of a geometric model, the processing unit 12 is further configured to add, with regard to each point cloud in the point clouds of the different static objects, a spatial information property of the point cloud to the metadata corresponding to the point cloud.

In some examples, the first indication information is a first field in the first box, and the first box indicates the association relation exists among all the items in the entity group.

In some examples, if the value of the first field is a first numerical value, then the first field indicates that the items having the association relation in the entity group are the static panoramic images from different viewpoints; or, if the value of the first field is a second numerical value, then the first field indicates that the items having the association relation in the entity group are point clouds of different static objects compressed in a point cloud compressed manner on the basis of a geometric model; or, if the value of the first field is a third numerical value, then the first field indicates that the items having the association relation in the entity group are point clouds of different static objects compressed in a point cloud compressed mode on the basis of traditional video coding; or, if the value of the first field is a fourth numerical value, then the first field indicates that the items having the association relation in the entity group are point clouds of static panoramic images and static objects.

In some examples, if the items having the association relation in the entity group are static panoramic images from different viewpoints, then the first indication information is a second box, and the second box indicates that the items having the association relation in the entity group are static panoramic images from different viewpoints.

In some examples, if the items having the association relation in the entity group are point clouds of different static objects compressed in a point cloud compression mode on the basis of a geometric mode, then the first indication information is a third box, and the third box indicates that the items having the association relation in the entity group are point clouds of different static objects compressed in a point cloud compression mode on the basis of a geometric mode.

It is to be understood that the apparatus examples and the method examples may correspond to each other, and similar descriptions may be made with reference to the method examples. To avoid repetition, the description is omitted here. Specifically, The apparatus 10 shown in FIG. 7 may execute the method example corresponding to the file packing device, and the foregoing and other operations and/or functions of each module in the apparatus 7 are respectively for implementing the method example corresponding to the file packing device, and are not described herein again for brevity.

Figure 8:
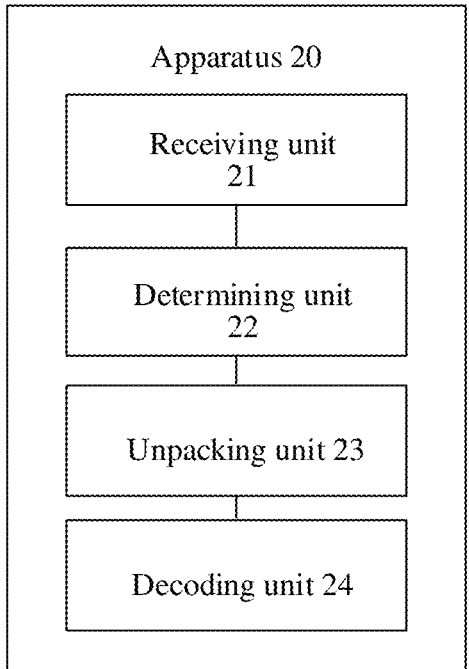
FIG. 8 is a schematic structural diagram of a media file unpacking apparatus according to an example of the present subject matter.

FIG. 8 is a schematic structural diagram of a media file unpacking device according to an example of the present subject matter; and the apparatus 20 is applied to a file unpacking device, and the device 20 includes:

a receiving unit 21, configured to receive media files of N items transmitted by the file packing device, the items at least including at least one of point clouds and static panoramic images, N is a positive integer greater than 1, the media files including at least one entity group, the code stream of at least one item is packed in the entity group, the media files further include first indication information corresponding to the entity group, and the first indication information is used for indicating the types of the items having the association relation in the entity group;

a determining unit 22, configured to determine, with regard to each entity group in the at least one entity group, a target item to be decoded in the entity group according to the first indication information corresponding to the entity group;

an unpacking unit 23, configured to unpack the target item to obtain the code stream of the target item; and a decoding unit 24, configured to decode the code stream of the target item to obtain the target item.

In some examples, the items having the association relation in the entity group include: at least one of static panoramic images and point clouds, static panoramic images from different viewpoints, and point clouds of different static objects.

In some examples, if the first indication information indicates that the items having the association relation in the entity group are static panoramic images from different viewpoints, and the metadata of each static panoramic image includes a viewpoint information property of a viewpoint corresponding to each static panoramic image, the determining unit 22 is specifically configured to determine the static panoramic image conforming to the interaction operation of the user in the entity group as a target item to be decoded in the entity group according to the interaction operation of the user and the viewpoint information property of the viewpoint corresponding to the static panoramic image; or, if the first indication information indicates that the items having the association relation in the entity group are point clouds of different static objects compressed in a point cloud compression mode on the basis a geometric model, and the metadata of the point cloud of each static object includes a spatial information property of each point cloud, the determining unit 22 is specifically configured to determine the point cloud of the static object conforming to the interaction operation of the user in the entity group as a target item to be decoded in the entity group according to the interaction operation of the user and the spatial information property of each point cloud.

In some examples, the first indication information is a first field in the first box, and the first box indicates the association relation exists among all the items in the entity group.

In some examples, if the value of the first field is a first numerical value, then the first field indicates that the items having the association relation in the entity group are the static panoramic images from different viewpoints; or, if the value of the first field is a second numerical value, then the first field indicates that the items having the association relation in the entity group are point clouds of different static objects compressed in a point cloud compressed manner based on a geometric model; or, if the value of the first field is a third numerical value, then the first field indicates that the items having the association relation in the entity group are point clouds of different static objects compressed in a point cloud compressed mode on the basis of traditional video coding; or, if the value of the first field is a fourth numerical value, then the first field indicates that the items having the association relation in the entity group are point clouds of static panoramic images and static objects.

In some examples, if the items having the association relation in the entity group are static panoramic images from different viewpoints, then the first indication information is a second box, and the second box indicates that the items having the association relation in the entity group are static panoramic images from different viewpoints.

In some examples, if the items having the association relation in the entity group are point clouds of different static objects compressed in a point cloud compression mode on the basis of a geometric mode, then the first indication information is a third box, and the third box indicates that the items having the association relation in the entity group are point clouds of different static objects compressed in a point cloud compression mode on the basis of a geometric mode.

It is to be understood that the apparatus examples and the method examples may correspond to each other, and similar descriptions may be made with reference to the method examples. To avoid repetition, the description is omitted here. Specifically, The apparatus 20 shown in FIG. 8 may execute the method example corresponding to a server, and the foregoing and other operations and/or functions of each module in the apparatus 20 are respectively for implementing the method example corresponding to the file packing device, and are not described herein again for brevity.

The apparatus of this example of the present subject matter is described above in terms of functional modules in conjunction with accompany drawings. It is to be understood that the functional modules may be implemented by hardware, by instructions in software, or by a combination of hardware and software modules. Specifically, The steps of the method example in this example of the present subject matter may be completed by integrated logic circuits of hardware in a processor and/or instructions in the form of software, and the steps of the method disclosed in this example of the present subject matter may be directly performed and completed by a hardware decoding processor, or performed and completed by a combination of hardware and software modules in a decoding processor.

Optionally, the software module may be located in a non-transitory storage medium that is mature in the art, such as a random access memory (RAM), a flash memory, a read-only memory (ROM), a programmable ROM, an electrically erasable programmable memory, or a register. The storage medium is located in the memory, the processor reads information in the memory and completes the steps of the method example in combination with hardware thereof.

Figure 9:
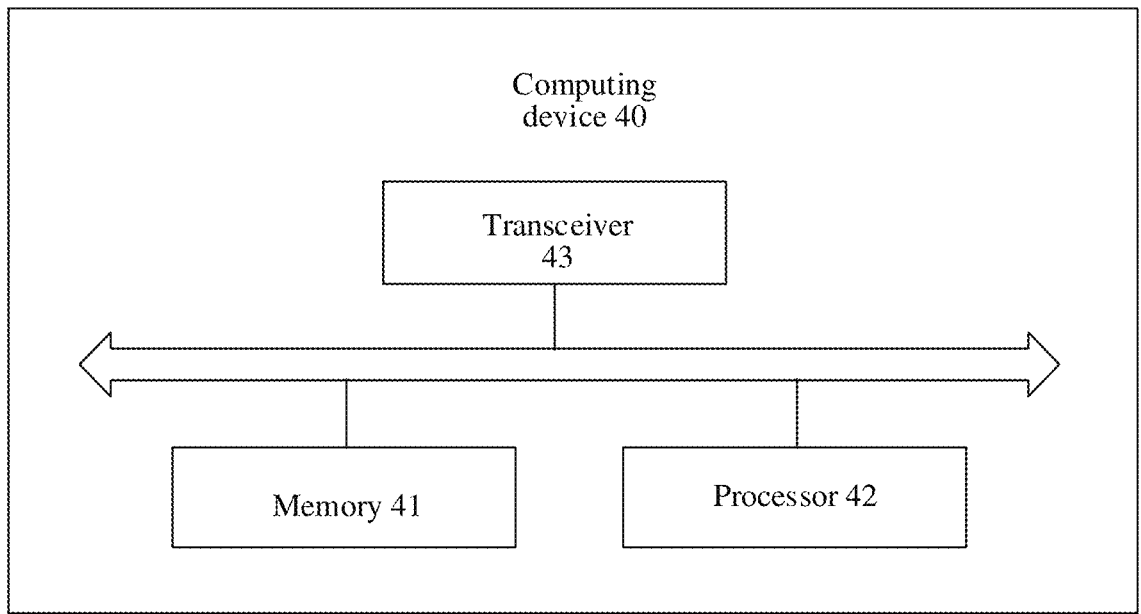
FIG. 9 is a schematic block diagram of a computing device according to this example of the present subject matter.

FIG. 9 is a schematic block diagram of a computing device according to this example of the present subject matter, the computing device may be the foregoing file packing device or the file unpacking device, or the computing device has functions of the file packing device and the file unpacking device.

As shown in FIG. 9, the computing device 40 may include: a memory 41 and a memory 42, the memory 41 is configured to store a computer program and transmit the program code to the memory 42. In other words, the memory 42 may invoke and run the computer program from the memory 41 to implement the method in this example of the present subject matter.

For example, the memory 42 may be configured to execute the foregoing method example according to instructions in the computer programs.

In some examples of the present subject matter, the memory 42 may include but is not limited to:

a general-purpose processor, a digital signal processor (DSP), an application specific integrated circuit (ASIC), a field programmable gate array (FPGA), or other programmable logic devices, discrete gate or transistor logic devices, and discrete hardware components and the like.

In some examples of the present subject matter, the memory 41 includes but is not limited to: a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, for example, a static RAM (SRAM), a dynamic RAM (DRAM), a synchronous DRAM (SDRAM), a double data rate SDRAM (DDRS-DRAM), an enhanced SDRAM (ESDRAM), a synch link DRAM (SLDRAM), and a direct rambus RAM (DRRAM), are available.

In some examples of the present subject matter, the computer program may be divided into one or more modules, and the one or more modules are stored in the memory 41 and executed by the memory 42 to perform the method provided in the present subject matter. The one or more modules may be a series of computer program instruction fragments capable of completing specific functions, and the instruction fragments describe the execution process of the computer program in a video making device.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function is performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

As shown in FIG. 9, the computing device 40 may further include: a transceiver 40, the transceiver 43 is capable of being connected to the memory 42 or the memory 41.

The memory 42 may control the transceiver 43 to communicate with other devices, specifically, the transceiver may transmit information or data to the other devices, or receive the information or data transmitted by the other devices. The transceiver 43 may include a transmitter or a receiver. The transceiver 43 may further include antennas, and the number of the antennas may be one or more.

It is to be understood that components in the video making device are coupled together by using a bus system, where in addition to a data bus, the bus system may further include a power bus, a control bus and a status signal bus.

The present subject matter further provides a non-transitory computer storage medium, storing a computer program, and the computer program, when executed by a computer, causes the computer to perform the method described in the foregoing method examples. Or, the present subject matter further provides a computer program product including instructions, and the instructions, when executed by a computer, causes the computer to perform the method described in the foregoing method examples.

When software is used for implementation, implementation may be partially or entirely performed in the form of a computer program product. The computer program product includes one or more computer instructions. The procedures or functions described in accordance with this example of the application are all or partially generated when the computer program instructions are loaded and executed on the computer. The computer may be a general-purpose computer, a special-purpose computer, a computer network, or another programmable apparatus. The computer instructions may be stored in a non-transitory computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may notice that the example modules and algorithm steps described with reference to the examples disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of the present subject matter.

In the several examples provided in the present subject matter, it is to be understood that the disclosed system, apparatus, and method may be implemented in other manners. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network units. Some or all of the modules may be selected according to actual needs to achieve the objectives of the solutions of this example. For example, functional modules in the examples of in the present subject matter may be integrated into one processing module, or each of the modules may exist alone physically, or two or more modules are integrated into one module.

The foregoing contents are merely specific implementation manners of the present subject matter, but are not intended to limit the protection scope of the present subject matter. Any variation or replacement readily figured out by a person skilled in the art within the technical scope disclosed in the present subject matter shall fall within the protection scope of the present subject matter. Therefore, the protection scope of the present subject matter shall be subject to the appended claims.

The invention claimed is:

1. A media file packing method applied to a file packing device, comprising:

acquiring code streams after N items are coded, wherein
the items comprise point clouds or static panoramic images, and
N is a positive integer greater than 1;
packing the code streams of the N items in at least one entity group;
adding, with regard to each entity group in the at least one entity group, first indication information to the entity group to obtain media files of the N items, wherein
the first indication information is used for indicating media types of all items having an association relation in the entity group and the first indication information is configured to enable a file unpacking device to determine a target item to be decoded in the entity group; and
transmitting the media files of the N items to the file unpacking device.

2. The method according to claim 1, wherein the items having the association relation in the entity group comprises:

at least one of static panoramic images and point clouds, static panoramic images from different viewpoints, or point clouds of different static objects.

3. The method according to claim 2, further comprising:

when the items having the association relation in the entity group are static panoramic images from different viewpoints,
adding, with regard to each static panoramic image in the static panoramic images from different viewpoints, a viewpoint information property of a viewpoint to which the static panoramic image belongs to metadata corresponding to the static panoramic image.

4. The method according to claim 2, further comprising:

when the items having the association relation in the entity group are point clouds of different static objects compressed in a point cloud compression mode based on a geometric model,
adding, with regard to each point cloud in the point clouds of different static object, a spatial information property of the point cloud to metadata corresponding to the point cloud.

5. The method according to claim 2, wherein
the first indication information is a first field in a first box, and
the first box indicates that all the items in the entity group have an association relation with each other.

6. The method according to claim 5, wherein
when a value of the first field is a first numerical value, then
the first field indicates that the items having the association relation in the entity group are static panoramic images from different viewpoints; or
when the value of the first field is a second numerical value, then
the first field indicates that the items having the association relation in the entity group are point clouds of different static objects compressed in a point cloud compressed manner based on a geometric model; or
when the value of the first field is a third numerical value, then
the first field indicates that the items having the association relation in the entity group are point clouds of different static objects compressed in a point cloud compressed mode based on traditional video coding; or
when the value of the first field is a fourth numerical value, then
the first field indicates that the items having the association relation in the entity group are point clouds of static panoramic images and static objects.

7. The method according to claim 2, wherein
when the items having the association relation in the entity group are static panoramic images from different viewpoints, then:
the first indication information is a second box, and
the second box indicates that the items having the association relation in the entity group are static panoramic images from different viewpoints.

8. The method according to claim 2, wherein
when the items having the association relation in the entity group are point clouds of different static objects compressed in a point cloud compression mode based on a geometric model, then:
the first indication information is a third box, and
the third box indicates that the items having the association relation in the entity group are point clouds of different static objects compressed in a point cloud compression mode based on a geometric model.

9. A media file unpacking method, applied to a file unpacking device, comprising:

receiving media files of N items transmitted by a file packing device, wherein the items comprise at least one of point clouds or static panoramic images, N is a positive integer greater than 1, the media files comprise an entity group, a code stream of at least one item is packed into the entity group, the media files further comprise first indication information corresponding to each entity group, and the first indication information is used for indicating media types of all items having an association relation in the entity group;

determining, with regard to each entity group in the at least one entity group, a target item to be decoded in the entity group according to the first indication information corresponding to the entity group;

unpacking the target item to obtain the code stream of the target item; and decoding the code stream of the target item to obtain the target item.

10. The method according to claim 9, wherein all items having the association relation in the entity group comprises:

at least one of static panoramic images and point clouds, static panoramic images from different viewpoints, and point clouds of different static objects.

11. The method according to claim 10, wherein the determining the target item to be decoded in the entity group comprises:

when the first indication information indicates that the items having the association relation in the entity group are static panoramic images from different viewpoints and metadata of each static panoramic image comprises a viewpoint information property of a viewpoint corresponding to each static panoramic image, determining the static panoramic image in the entity group conforming to interaction operation of a user as a target item to be decoded in the entity group according to the interaction operation of the user and the viewpoint information property of the viewpoint corresponding to the static panoramic image; or when the first indication information indicates that all items having the association relation in the entity group are point clouds of different static objects compressed in a point cloud compression mode based on a geometric model and metadata of the point cloud of each static object comprises spatial information property of each point cloud, determining the point cloud of the static object in the entity group conforming to the interaction operation of the user as a target item to be decoded in the entity group according to the interaction operation of the user and the spatial information property of each point cloud.

12. The method according to claim 10, wherein the first indication information is a first field in a first box, and the first box indicates that all the items in the entity group have an association relation with each other.

13. The method according to claim 12, wherein when a value of the first field is a first numerical value, then the first field indicates that the items having the association relation in the entity group are static panoramic images from different viewpoints; or, when the value of the first field is a second numerical value, then the first field indicates that all items having the association relation in the entity group are point clouds of different static objects compressed in a point cloud compressed manner based on a geometric model.

14. The method according to claim 12, wherein when a value of the first field is a third numerical value, then the first field indicates that the items having the association relation in the entity group are point clouds of different static objects compressed in a point cloud compressed mode based on traditional video coding; or, when the value of the first field is a fourth numerical value, then the first field indicates that all items having the association relation in the entity group are point clouds of static panoramic images and static objects.

15. The method according to claim 10, wherein when the items having the association relation in the entity group are static panoramic images from different viewpoints, then the first indication information is a second box, and the second box indicates that all items having the association relation in the entity group are static panoramic images from different viewpoints.

16. The method according to claim 10, wherein when the items having the association relation in the entity group are point clouds of different static objects compressed in a point cloud compression mode based on a geometric model, then the first indication information is a third box, and the third box indicates that all items having the association relation in the entity group are point clouds of different static objects compressed in a point cloud compression mode based on a geometric model.

17. A media file packing device, comprising:

a processor; and a memory coupled to the processor and storing a computer program executable by the processor to configure the processor to perform the method according to claim 1.

18. A media file unpacking device, comprising:

a processor; and a memory coupled to the processor and storing a computer program executable by the processor to configure the processor to:

receive media files of N items transmitted by a file packing device, wherein the N items comprise at least one of point clouds or static panoramic images, N is a positive integer greater than 1, the media files comprise an entity group, a code stream of at least one item is packed into the entity group, the media files further comprise first indication information corresponding to each entity group, and-the first indication information is used for indicating media types of all items having an association relation in the entity group;

determine, with regard to each entity group in the at least one entity group, a target item to be decoded in the entity group according to the first indication information corresponding to the entity group;

unpack the target item to obtain the code stream of the target item; and decode the code stream of the target item to obtain the target item.

19. A non-transitory computer-readable medium comprising instructions operable, when executed by one or more computing systems, to perform the method according to claim 1.

20. A non-transitory computer-readable medium comprising instructions operable, when executed by one or more computing systems, to: perform the method of claim 9.

* * * * *